(12) United States Patent
Nagasawa et al.

(10) Patent No.: US 8,367,781 B2
(45) Date of Patent: *Feb. 5, 2013

(54) GOLF BALL

(75) Inventors: Hiroyuki Nagasawa, Chichibu (JP); Hiroshi Higuchi, Chichibu (JP); Motoki Aoyagi, Chichibu (JP); Daisuke Arai, Chihchibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,969

(22) Filed: Jul. 27, 2011

(65) Prior Publication Data

US 2011/0281669 A1    Nov. 17, 2011

Related U.S. Application Data

(63) Continuation of application No. 11/507,534, filed on Aug. 22, 2006, now Pat. No. 8,182,367.

(51) Int. Cl.
*A63B 37/12* (2006.01)
*A63B 37/00* (2006.01)
*C08L 75/04* (2006.01)

(52) U.S. Cl. ......... 525/440.01; 525/440.11; 525/440.12; 525/92 C; 525/127; 525/130; 525/424; 525/457; 473/378

(58) Field of Classification Search .................. None
See application file for complete search history.

(56) References Cited

U.S. PATENT DOCUMENTS

| | | | |
|---|---|---|---|
| 3,395,109 A | 7/1968 | Molitor et al. | |
| 4,248,432 A | 2/1981 | Hewitt et al. | |
| 4,347,338 A | 8/1982 | Torii et al. | |
| 4,442,282 A | 4/1984 | Kolycheck | |
| 4,611,810 A * | 9/1986 | Kamata et al. | 473/372 |
| 5,006,297 A | 4/1991 | Brown et al. | |
| 5,334,673 A | 8/1994 | Wu | |
| 5,698,150 A * | 12/1997 | Pasqua et al. | 264/148 |
| 5,733,428 A | 3/1998 | Calabria et al. | |
| 5,888,437 A | 3/1999 | Calabria et al. | |
| 5,897,884 A | 4/1999 | Calabria et al. | |
| 5,929,189 A | 7/1999 | Ichikawa et al. | |
| 5,947,843 A | 9/1999 | Calabria et al. | |
| 6,117,024 A | 9/2000 | Dewanjee | |
| 6,123,628 A | 9/2000 | Ichikawa et al. | |
| 6,190,268 B1 | 2/2001 | Dewanjee | |
| 6,702,694 B1 * | 3/2004 | Watanabe | 473/371 |
| 6,702,695 B1 | 3/2004 | Higuchi et al. | |
| 6,747,100 B2 | 6/2004 | Ichikawa et al. | |
| 6,806,323 B2 | 10/2004 | Ichikawa et al. | |
| 6,887,168 B2 | 5/2005 | Hayashi et al. | |
| 6,939,924 B2 * | 9/2005 | Kim et al. | 525/457 |
| 7,387,581 B2 | 6/2008 | Higuchi et al. | |
| 7,946,933 B2 * | 5/2011 | Nanba et al. | 473/373 |
| 7,959,524 B2 * | 6/2011 | Nanba et al. | 473/373 |
| 2001/0050447 A1 | 12/2001 | Inoue et al. | |
| 2003/0158352 A1 | 8/2003 | Rajagopalan et al. | |
| 2003/0203771 A1 | 10/2003 | Rosenberg et al. | |
| 2004/0106473 A1 * | 6/2004 | Hayashi et al. | 473/371 |
| 2005/0288125 A1 * | 12/2005 | Takesue et al. | 473/371 |
| 2008/0051223 A1 * | 2/2008 | Nagasawa et al. | 473/378 |
| 2008/0194359 A1 | 8/2008 | Higuchi et al. | |
| 2008/0214325 A1 | 9/2008 | Higuchi et al. | |
| 2008/0312008 A1 | 12/2008 | Higuchi et al. | |
| 2011/0201453 A1 * | 8/2011 | Kasashima et al. | 473/373 |

FOREIGN PATENT DOCUMENTS

| | | |
|---|---|---|
| JP | 58-2063 B2 | 1/1983 |
| JP | 9-271538 A | 10/1997 |
| JP | 11-178949 A | 7/1999 |
| JP | 2001-054588 A | 2/2001 |
| JP | 2002-336378 A | 11/2002 |
| JP | 2002-336380 A | 11/2002 |
| JP | 2004-000649 A | 1/2004 |
| JP | 2004-209071 A | 7/2004 |
| JP | 2006-042882 A | 2/2006 |

OTHER PUBLICATIONS

Michaeli; "Training in Injection Molding" 2$^{nd}$ Edition 2001 Hanser Publishers; pp. 32,33.*

* cited by examiner

*Primary Examiner* — David Buttner
(74) *Attorney, Agent, or Firm* — Sughrue Mion, PLLC

(57) ABSTRACT

The invention provides a golf ball having a core and one or more cover layer encasing the core, wherein at least one cover layer is formed by injection-molding a single resin composition of primarily (A) a thermoplastic polyurethane and (B) a polyisocyanate compound, and at least some polyisocyanate compound in which all the isocyanate groups on the molecule remain in an unreacted state is present in the resin composition. The golf ball has a high rebound, an excellent spin performance and an excellent scuff resistance, and the cover layer-forming resin composition has excellent flow properties and an excellent cover layer manufacturability.

12 Claims, No Drawings

GOLF BALL

This is a continuation of application Ser. No. 11/507,534 filed Aug. 22, 2006 now U.S. Pat. No. 8,182,367. The entire disclosure of the prior application, application Ser. No. 11/507,534, is considered part of the disclosure of the accompanying continuation application and is hereby incorporated by reference.

BACKGROUND OF THE INVENTION

The present invention relates to a golf ball in which a specific thermoplastic polyurethane material is used as the cover material. More specifically, the invention relates to a golf ball which has a high rebound, excellent spin characteristics and an excellent scuff resistance, and which is made using a thermoplastic polyurethane material having excellent flow properties and thus has an excellent manufacturability.

The use of polyurethane materials as golf ball cover materials has received attention in recent years. Polyurethane materials are broadly divided, based on the process used to make molded parts therefrom, into thermoset polyurethane materials and thermoplastic polyurethane materials. Molded parts made of thermoset polyurethane materials can be obtained by mixing under applied heat a urethane prepolymer having isocyanate end groups with a liquid starting material such as a polyol or a polyamine as the curing agent, then pouring the mixture directly into a mold and heating to effect a urethane curing reaction.

Numerous golf balls which use such a thermoset polyurethane material have been disclosed in the prior art (e.g., Patent Reference 1: U.S. Pat. No. 5,334,673; Patent Reference 2: U.S. Pat. No. 6,117,024; and Patent Reference 3: U.S. Pat. No. 6,190,268). Methods of molding thermoset polyurethane materials are described in, for example, Patent Reference 4: U.S. Pat. No. 5,006,297; Patent Reference 5: U.S. Pat. No. 5,733,428; Patent Reference 6: U.S. Pat. No. 5,888,437; Patent Reference 7: U.S. Pat. No. 5,897,884; and Patent Reference 8: U.S. Pat. No. 5,947,843.

Because moldings made of thermoset polyurethane materials lack plasticity when heated, the starting materials and molded parts cannot be recycled. Moreover, given the length of the heating and curing step and of the cooling step and given the great difficulty of controlling the molding time owing to the high reactivity of the starting materials under heating and their instability, the manufacturability of molded parts made of thermoset polyurethane materials, when used as specialty moldings such as golf ball covers (moldings which encase a core material), is regarded as inefficient.

By contrast, moldings made of thermoplastic polyurethane materials are not obtained by directly reacting the starting materials. Instead, a linear polyurethane material synthesized using starting materials and a production method which differ somewhat from those for the thermoset polyurethane materials described above is employed in the molding operation. Such a polyurethane material is thermoplastic, and thermoplasticized polyurethane materials have the quality of solidifying when cooled. Such polyurethane materials can thus be molded using an injection molding machine. Injection molding a thermoplastic polyurethane material requires a much shorter molding time than the molding time for a thermoset polyurethane material and moreover is suitable for precision molding, making it ideal as a process for molding golf ball covers. In addition, thermoplastic polyurethane materials are recyclable, and are friendly to the global environment. Golf balls made using thermoplastic polyurethane materials are disclosed in, for example, Patent Reference 9: U.S. Pat. No. 3,395,109; Patent Reference 10: U.S. Pat. No. 4,248,432; and Patent Reference 11: U.S. Pat. No. 4,442,282.

However, golf ball covers made with conventional thermoplastic polyurethane materials have been unable to satisfy all of the following properties in a golf ball: feel on impact, controllability, rebound, and scuff resistance when hit with an iron.

To address this need, Patent Reference 12: JP-A 9-271538 discloses a golf ball cover made using a thermoplastic polyurethane material having a high resilience. Yet, even this golf ball cover falls short in terms of its scuff resistance when hit with an iron.

Patent Reference 13: JP-A 11-178949 describes a golf ball cover which has a relatively good scuff resistance when hit with an iron and is composed primarily of the reaction product of a thermoplastic polyurethane material with an isocyanate compound. In this cover, an isocyanate compound such as a block diisocyanate or an isocyanate dimer is added as an additive to the thermoplastic polyurethane material. Addition is carried out during melt mixing under applied heat using an extruder or during injection molding, with the reaction being effected during molding.

However, in the molding of a cover according to JP-A 11-178949 above, the isocyanate compound is hard to handle because it loses its activity in the presence of moisture, thus making it difficult to obtain a stable reaction product. In the case of blocked isocyanates, which are highly resistant to moisture absorption, the blocking agent that dissociates under heating has a strong odor, making it unsuitable for use in molding covers. Moreover, when the isocyanate compound is in the form of a powder or a solution, it is difficult to control the amount of addition to the thermoplastic polyurethane material, making control of the golf ball cover properties a challenge. Furthermore, owing to melting point and melt viscosity differences between the thermoplastic polyurethane material and the isocyanate compound, slippage arises within the molding machine, which sometimes makes thorough kneading impossible to achieve. In this prior art, for the reasons given above, control of the effects of moisture within the cover material and of the amount of additive included therein has been inadequate, making it impossible to achieve golf ball covers which are fully satisfactory in terms of their scuff resistance-improving effects.

The preferred thermoplastic polyurethane material described in JP-A 11-178949 is based on an aliphatic isocyanate. However, this thermoplastic polyurethane material has a very high reactivity with isocyanate, making the reaction difficult to control. As a result, one problem is that gelation tends to arise before the mixture is used in injection molding, making it impossible to ensure sufficient plasticity. Another problem is that gelation sometimes occurs during the molding operation. Yet another problem is that the resin to be recycled sometimes gels, as a result of which it cannot be reclaimed. These problems have made it difficult to put the above technology to practical use.

Patent Reference 14: JP-B 58-2063 (U.S. Pat. No. 4,347,338) describes a method of manufacturing thermoset polyurethane molded parts which involves intimately mixing a compound having two or more isocyanate groups with a thermoplastic resin which does not react with isocyanate groups, blending the resulting mixture with a thermoplastic polyurethane material, then furnishing the blend to a molding machine and molding. However, the objects of this art are simply to improve the solvent resistance and the resistance to continuous and repeated friction; the published specification makes no mention of the use of this molding material as a golf ball cover material. Accordingly, there continues to exist a desire for a golf ball cover material which can satisfy a number of properties required of golf balls; i.e., rebound, distance, spin characteristics, controllability, feel on impact, scuff resistance, cut resistance, and discoloration resistance.

Patent Reference 15: JP-A 2002-336378 discloses a golf ball which uses a cover material composed of a thermoplastic polyurethane material and an isocyanate mixture. The cover material is a thermoplastic polyurethane material which is recyclable, has a high rebound, and has an excellent scuff resistance. Such a cover material has both a good thermoplastic polyurethane manufacturability and exhibits physical properties comparable with those of thermoset polyurethanes. At the same time, the plasticizing effect of the isocyanate compound enhances the flow properties of the thermoplastic polyurethane material, thus enabling the manufacturability to be improved as well. However, this excellent art also has a number of drawbacks, including the generation of scorched material when the isocyanate mixture is charged directly into the molding machine, and variability in the mixing proportions due to the use of a dry blending process, which results in a poor uniformity and leads to poor molding stability. In addition, because the relative proportions within the isocyanate mixture of the isocyanate compound and the thermoplastic resin which substantially does not react with isocyanate are already decided, it has been difficult to freely select the amounts and types of the isocyanate compound and the thermoplastic resin that one wishes to add.

In addition, Patent Reference 16: JP-A 2002-336380 describes a golf ball wherein a material obtained by blending a thermoplastic polyurethane material that contains as the polymeric polyol a polyether polyol having an average molecular weight of at least 1500 and that has a rebound resilience of at least 40% with a specific isocyanate mixture is used as the cover material. However, this cover material has the same drawbacks as those associated with the art disclosed in aforementioned Patent Reference 15; namely, the generation of scorched material when the cover material is charged into the molding machine, poor molding stability, and limitations on selecting the amounts and types of isocyanate compound to be added.

SUMMARY OF THE INVENTION

It is thus an object of the present invention to provide a golf ball having a high rebound and an excellent scuff resistance, which ball is made using as the cover stock a thermoplastic polyurethane material of excellent flow properties and thus has excellent manufacturability.

The inventors have found that, in a golf ball composed of a core and one or more cover layer, by using as the material making up at least one cover layer a molding of a resin composition of primarily (A) a thermoplastic polyurethane and (B) a polyisocyanate compound, the golf ball having this cover layer exhibits a higher rebound and excellent scuff resistance, in addition to which the cover resin material has a high fluidity, resulting in a high cover layer-forming manufacturability. In particular, the inventors have found that by additionally including (C) a thermoplastic elastomer other than a thermoplastic polyurethane in the above resin composition and using a molding of the resin composition of (A) to (C) as the cover material, the above advantages can be effectively exhibited.

That is, on examining the role played by the addition of isocyanate to a cover material composed primarily of a thermoplastic polyurethane, the inventors have learned that if the form of the isocyanate within the cover starting material is preserved so that the isocyanate groups are in an unreacted state, during injection molding, the plasticizing effect increases the fluidity of the cover resin material, resulting in a higher manufacturability and a higher degree of freedom in molding. Moreover, because a necessary and sufficient amount of unreacted isocyanate groups is present within the cover resin material, by injection-molding this material under applied heat, crosslinking reactions with component A occur, thus obtaining a golf ball having a high rebound and an excellent scuff resistance.

Accordingly, the invention provides the following golf balls.

[1] A golf ball comprising a core and one or more cover layer encasing the core, wherein at least one cover layer is formed by injection-molding a single resin composition of primarily (A) a thermoplastic polyurethane and (B) a polyisocyanate compound, and at least some polyisocyanate compound in which all the isocyanate groups remain on the molecule in an unreacted state is present in the resin composition.

[2] The golf ball of claim 1, wherein the resin composition additionally includes (C) a thermoplastic elastomer other than thermoplastic polyurethane.

[3] The golf ball of claim 2, wherein some of the isocyanate groups in component B form bonds with active hydrogens in component A and/or component C, and the other isocyanate groups remain in an unreacted state within the resin composition.

[4] The golf ball of claim 2, wherein the weight ratio (A):(B):(C) of the respective components is 100:{2-50}:{0-50}.

[5] The golf ball of claim 2, wherein the weight ratio (A):(B):(C) of the respective components is 100:{2-30}:{8-50}.

[6] The golf ball of claim 1, wherein the total weight of components A and B combined is at most 90 wt %, of the overall weight of the cover layer.

[7] The golf ball of claim 1, wherein the resin composition has a melt mass flow rate (MFR) at 210° C. of at least 5 g/10 min.

[8] The golf ball of claim 1, wherein component B is one or more polyisocyanate compound selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate.

[9] The golf ball of claim 1, wherein component B is one or more polyisocyanate compound selected from the group consisting of 4,4'-diphenylmethane diisocyanate, dicyclohexylmethane diisocyanate and isophorone diisocyanate.

[10] The golf ball of claim 1, wherein component C is one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins.

[11] The golf ball of claim 1, wherein component C is one or more selected from the group consisting of polyester elastomers, polyamide elastomers and polyacetals.

DETAILED DESCRIPTION OF THE INVENTION

The invention is described more fully below.

The golf balls of the invention have a core and one or more cover layer encasing the core. At least one of the cover layers is made of a molded resin composition of primarily (A) a thermoplastic polyurethane and (B) a polyisocyanate compound. Such golf balls composed of a thermoplastic polyurethane have an excellent rebound, spin performance and scuff resistance.

The cover layer is composed mainly of a thermoplastic polyurethane, and is formed of a resin composition of primarily (A) a thermoplastic polyurethane and (B) a polyisocyanate compound.

To fully exhibit the advantageous effects of the invention, a necessary and sufficient amount of unreacted isocyanate groups should be present in the cover resin material. Specifically, it is recommended that the total weight of above components A and B combined be at least 60%, and preferably at least 70%, of the overall weight of the cover layer. Components A and B are described in detail below.

The thermoplastic polyurethane serving as component A has a structure which includes soft segments made of a polymeric polyol that is a long-chain polyol (polymeric glycol), and hard segments made of a chain extender and a polyisocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls made of a thermoplastic polyurethane composition having excellent properties such as resilience and manufacturability can be reliably obtained. The number-average molecular weight of the long-chain polyol is more preferably in a range of 1,700 to 4,000, and even more preferably in a range of 1,900 to 3,000.

As used herein, "number-average molecular weight of the long-chain polyol" refers to the number-average molecular weight computed based on the hydroxyl number measured in accordance with JIS K-1557.

Suitable chain extenders include those used in the prior art relating to thermoplastic polyurethanes. For example, low-molecular-weight compounds which have a molecular weight of 400 or less and have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

The polyisocyanate compound is not subject to any particular limitation; preferred use may be made of one that is used in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The mixing ratio of activated hydrogen atoms to isocyanate groups in the above polyurethane-forming reaction can be controlled within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane used as component A. Production may be carried out by either a prepolymer process or one-shot process in which the long-chain polyol, chain extender and polyisocyanate compound are used and a known urethane-forming reaction is effected. Of these, a process in which melt polymerization is carried out in a substantially solvent-free state is preferred. Production by continuous melt polymerization using a multiple screw extruder is especially preferred.

Illustrative examples of the thermoplastic polyurethane serving as component A include commercial products such as Pandex T8295, Pandex T8290, Pandex T8260, Pandex T8295 and Pandex T8290 (all available from DIC Bayer Polymer, Ltd.).

Next, concerning the polyisocyanate compound used as component B, it is critical that, in at least some of the polyisocyanate compound in the single resin composition, all the isocyanate groups on the molecule remain in an unreacted state. That is, polyisocyanate compound in which all the isocyanate groups on the molecule are in a completely free state must be present within the single resin composition, and such a polyisocyanate compound may be present together with polyisocyanate compound in which some of the isocyanate groups on the molecule are in a free state.

Various types of isocyanates may be employed without particular limitation as this polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of such effects as the rise in viscosity that accompanies the reaction with the thermoplastic polyurethane serving as component A and the physical properties of the resulting golf ball cover material.

In the practice of the invention, although not an essential constituent, a thermoplastic elastomer other than the above-described thermoplastic polyurethane may be included as component C together with components A and B. Incorporating this component C in the above resin composition enables the fluidity of the resin composition to be further improved and enables increases to be made in various properties required of golf ball cover materials, such as resilience and scuff resistance.

Component C, which is a thermoplastic elastomer other than the above thermoplastic polyurethane, is exemplified by one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of a polyester elastomer, a polyamide elastomer or a polyacetal is especially preferred for such reasons as enhancing the resilience and scuff resistance while retaining a good manufacturability.

The relative proportions of above components A, B and C are not subject to any particular limitation, although to fully achieve the advantageous effects of the invention, it is preferable for the weight ratio (A):(B):(C) of the respective components to be 100:{2-50}:{0-50}, and more preferably 100:{2-30}:{8-50}.

In the practice of the invention, the resin composition is prepared by mixing component A with component B, and additionally mixing also component C. It is critical to select the mixing conditions such that, of the polyisocyanate compound, at least some polyisocyanate compound is present in which all the isocyanate groups on the molecule remain in an unreacted state. For example, treatment such as the mixture in an inert gas (e.g., nitrogen) or in a vacuum state must be furnished. The resin composition is then injection-molded around a core which has been placed in a mold. To smoothly and easily handle the resin composition, it is preferable for it to be formed into pellets having a length of 1 to 10 mm and a diameter of 0.5 to 5 mm. Isocyanate groups in an unreacted state remain in these resin pellets; while the resin composition is being injection-molded about the core, or due to post-treatment such as annealing, the unreacted isocyanate groups react with component A or component C to form a crosslinked material.

Various additives other than the ingredients making up the above-described thermoplastic polyurethane may be optionally included in the above resin composition. Additives that may be suitably used include pigments, dispersants, antioxidants, light stabilizers, ultraviolet absorbers and parting agents.

The melt mass flow rate (MFR) at 210° C. of the resin composition is not subject to any particular limitation. However, to increase the flow properties and manufacturability, the MFR is preferably at least 5 g/10 min, and more preferably at least 6 g/10 min. Too low a melt mass flow rate reduces the fluidity, which may cause eccentricity during injection molding and may also lower the degree of freedom in the moldable cover thickness. The measured value of the melt mass flow rate is obtained in accordance with JIS-K7210 (1999 edition).

The above method of molding the cover layer is exemplified by feeding the above resin composition to an injection molding machine, and injecting the molten resin composition around the core so as to form a cover layer. The molding temperature varies according to such factors as the type of thermoplastic polyurethane, but is typically in a range of 150 to 250° C.

When injection molding is carried out, it is desirable though not essential to carry out molding in a low-humidity environment such as by purging with a low-temperature gas using an inert gas such as nitrogen or low dew-point dry air or by vacuum treating some or all places on the resin paths from the resin feed area to the mold interior. Illustrative, non-limiting examples of the medium used for transporting the resin include low-moisture gases such as low dew-point dry air or nitrogen gas. By carrying out molding in such a low-humidity environment, reaction by the isocyanate groups is kept from proceeding before the resin has been charged into the mold interior. As a result, polyisocyanate in which the isocyanate groups are present in an unreacted state is included to some degree in the resin molded part, thus making it possible to reduce variable factors such as unwanted rises in viscosity and enabling the essential crosslinking efficiency to be enhanced.

Techniques that could be used to confirm the presence of polyisocyanate compound in an unreacted state within the resin composition prior to injection molding about the core include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin composition (cover material) used in the invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop from about 150° C. is not observed, but a weight drop from about 230 to 240° C. can be observed.

After the resin composition has been molded as described above, its properties as a golf ball cover can be further improved by carrying annealing so as to induce the crosslinking reaction to proceed further. "Annealing," as used herein, refers to aging the cover in a fixed environment for a fixed length of time.

At least one of the one or more cover layers on the inventive golf ball is made of the above-described thermoplastic polyurethane composition. The cover layer made of this thermoplastic polyurethane composition has a surface hardness, expressed as the durometer D hardness, of generally 30 to 90, preferably 35 to 85, more preferably 40 to 80, and even more preferably 45 to 75. If the surface hardness of the cover layer is too low, the spin rate when the ball is hit with a driver may increase, shortening the carry of the ball. On the other hand, if the surface hardness of the cover layer is too high, the feel of the ball on impact may worsen and the urethane material may have a poor resilience and durability.

"Durometer D hardness" refers herein to the hardness measured with a type D durometer in accordance with JIS K7215.

The above-described cover layer has a rebound resilience of generally at least 35%, preferably at least 40%, more preferably at least 45%, and even more preferably at least 47%. Because a thermoplastic polyurethane does not inherently have that good a resilience, strict selection of the rebound resilience is preferable. If the rebound resilience of the cover layer is too low, the distance traveled by the golf ball may dramatically decrease. On the other hand, if the rebound resilience of the cover layer is too high, the initial velocity on shots of under 100 yards that require control and on putts may be too high and the feel of the ball when played may not agree with the golfer. "Rebound resilience" refers herein to the rebound resilience obtained in accordance with JIS K7311.

The core used in the inventive golf ball is not subject to any particular limitation. For example, various cores that may be used include solid cores for two-pieces balls, solid cores having a plurality of vulcanized rubber layers, solid cores having a plurality of resin layers, and thread-wound cores having a rubber thread layer. No particular limitation is imposed on the diameter, weight, hardness, constituent materials and other characteristics of the core.

In cases where the golf ball of the invention has a construction that includes an intermediate layer, no particular limitation is imposed on the hardness, constituent materials, thickness and other characteristics of the intermediate layer. If necessary, a primer layer may be provided to improve adhesion between the intermediate layer and the cover.

It is preferable for the cover layer to have a thickness within a range of 0.1 to 5.0 mm. The cover layer is not limited to a single layer, and may be formed with a multilayer construction of two or more layers. If the cover is formed with a multilayer construction, the overall thickness of the cover may be set within the foregoing range.

The golf ball of the invention is preferably formed to a diameter and weight in accordance with the Rules of Golf, and is generally formed to a diameter of not less than 42.67 mm and a weight of not more than 45.93 g. The diameter is preferably from 42.67 to 42.9 mm. It is suitable for deflection by the ball when compressed under a load of 980 N (100 kg) to be generally from 2.0 to 4.0 mm, and especially from 2.2 to 3.8 mm.

As explained above, the golf ball of the invention has a high rebound, excellent spin characteristics and scuff resistance, and the resin composition used therein has high flow properties and an excellent cover layer manufacturability.

EXAMPLES

The following Examples of the invention and Comparative Examples are provided by way of illustration and not by way of limitation.

Examples 1 to 5, and Comparative Examples 1 to 3

Core Formulation:

| | |
|---|---|
| Polybutadiene rubber | 100 parts by weight |
| Zinc diacrylate | 24.5 parts by weight |
| Zinc oxide | 12 parts by weight |
| Dicumyl peroxide | 1 part by weight |
| Zinc pentachlorothiophenol | 1 part by weight |

The core material of the above formulation was kneaded, following which it was molded and vulcanized at 155° C. for 20 minutes, thereby obtaining a 38.5 mm diameter solid core for a two-piece solid golf ball. The polybutadiene rubber used was BR01 produced by JSR Corporation. The resulting core had a specific gravity of 1.17 g/cm$^3$, a deflection of 3.4 mm when compressed under a load of 980 N (100 kg), and an initial velocity, measured in accordance with the measurement method of the USGA (R&A), of 78.1 m/s.

In Examples 1 to 5 of the invention, the starting materials shown in Table 1 (units: parts by weight) were worked in a twin-screw extruder and under a nitrogen gas atmosphere, thereby giving cover resin compositions. These resin compositions were in the form of pellets having a length of 3 mm and a diameter of 1 to 2 mm.

The solid core was placed within an injection-molding mold and the cover material was injection-molded around the core, thereby giving two-piece golf balls in Examples 1 to 5 of the invention, each having a 2.1 mm thick cover. Samples for measuring the physical properties of the cover were prepared by injection-molding a 2 mm thick sheet, annealing the molded sheet for 8 hours at 100° C., then holding the annealed sheet at room temperature for one week. The manufacturability of the cover material was also evaluated. The results are shown in Table 1.

In Comparative Examples 1 and 2, the solid core was placed within an injection-molding mold and a dry blend of thermoplastic polyurethane pellets with isocyanate mixture pellets was injection-molded around the core, thereby giving two-piece golf balls having a 2.1 mm thick cover. Subsequent treatment was carried out in the same way as described above for the examples of the invention. In Comparative Example 3, only pellets composed entirely of thermoplastic polyurethane were injection-molded, and annealing was not carried out.

TABLE 1

| | | Example | | | | |
|---|---|---|---|---|---|---|
| | | 1 | 2 | 3 | 4 | 5 |
| Thermoplastic polyurethane (pbw) | Polyurethane 1 | 100 | | | | |
| | Polyurethane 2 | | 100 | 100 | 100 | 100 |
| Polyisocyanate compound (pbw) | | 9 | 9 | 9 | 9 | 9 |
| Thermoplastic elastomer (pbw) | | 15 | 15 | 15 | 15 | 15 |
| Titanium oxide (pbw) | | 3.5 | 3.5 | 3.5 | 3.5 | 3.5 |
| Ultramarine blue (pbw) | | 0.4 | 0.4 | 0.4 | 0.4 | 0.4 |
| Polyethylene wax (pbw) | | 1.5 | 1.5 | 1.5 | 1.5 | 1.5 |
| Montan wax (pbw) | | 0.8 | 0.8 | 0.8 | 0.8 | 0.8 |
| MFR (at 210° C.) | | 7.8 | 8.0 | 8.0 | 8.0 | 8.0 |
| Cover properties | Surface hardness (D hardness) | 59 | 60 | 60 | 60 | 60 |
| | Rebound resilience (%) | 53 | 52 | 52 | 52 | 52 |
| Ball properties | Diameter (mm) | 42.7 | 42.7 | 42.7 | 42.7 | 42.7 |
| | Weight (g) | 45.6 | 45.6 | 45.6 | 45.6 | 45.6 |
| | Hardness (mm) | 2.3 | 2.3 | 2.2 | 2.3 | 2.3 |
| | Initial velocity (m/s) | 77.1 | 77.1 | 77.1 | 77.1 | 77.0 |
| | Scuff resistance 23° C. | 4 | 4 | 5 | 5 | 5 |
| | 13° C. | 4 | 4 | 5 | 5 | 5 |
| | 0° C. | 3 | 4 | 4 | 4 | 4 |
| Manufacturability | | good | good | good | good | good |

TABLE 2

|  |  | Comparative Example | | |
|---|---|---|---|---|
|  |  | 1 | 2 | 3 |
| Thermoplastic polyurethane (pbw) | Polyurethane 3 | 100 | 0 | 100 |
|  | Polyurethane 1 | 0 | 100 | 0 |
| Isocyanate mixture (pbw) |  | 20 | 20 | 0 |
| Titanium oxide (pbw) |  | 3.5 | 3.5 | 3.5 |
| Ultramarine blue (pbw) |  | 0.4 | 0.4 | 0.4 |
| Polyethylene wax (pbw) |  | 1.5 | 1.5 | 1.5 |
| Montan wax (pbw) |  | 0.8 | 0.8 | 0.8 |
| MFR (at 210° C.) |  | 2.2* | 2.4* | 1.8 |
| Cover properties | Surface hardness (D hardness) | 61 | 60 | 59 |
|  | Rebound resilience (%) | 45 | 45 | 44 |
| Ball properties | Diameter (mm) | 42.7 | 42.7 | 42.7 |
|  | Weight (g) | 45.7 | 45.7 | 45.7 |
|  | Hardness (mm) | 2.3 | 2.3 | 2.4 |
|  | Initial velocity (m/s) | 77.1 | 77.1 | 77.0 |
|  | Scuff resistance 23° C. | 4 | 4 | 2 |
|  | 13° C. | 4 | 4 | 2 |
|  | 0° C. | 3 | 3 | 1 |
| Manufacturability |  | NG | NG | good |

*These are reference values; the cover material prepared was a mixture of different types of pellets.

Polyurethane 1 (Thermoplastic Polyurethane Material)
Pandex T8295, produced by DIC Bayer Polymer, Ltd.
Polyurethane 2 (Thermoplastic Polyurethane Material)
Pandex T8295 and Pandex T8290 were used in a weight ratio of 75/25. Both are products of DIC Bayer Polymer, Ltd.
Polyurethane 3 (Thermoplastic Polyurethane Material)
Pandex T8260 and Pandex T8295 were used in a weight ratio of 50/50. Both are products of DIC Bayer Polymer, Ltd.
Explanation of Pandex T8295: A MDI-PTMG-type thermoplastic polyurethane material having a resin hardness of JIS-A97 and a rebound resilience of 44%.
Explanation of Pandex T8290: A MDI-PTMG-type thermoplastic polyurethane material having a resin hardness of JIS-A93 and a rebound resilience of 52%.
Explanation of Pandex T8260: A MDI-PTMG-type thermoplastic polyurethane material having a Durometer D resin hardness of 56 and a rebound resilience of 45%.

Isocyanate Mixture
Crossnate EM-30 (an isocyanate masterbatch produced by Dainichiseika Color & Chemicals Mfg. Co., Ltd.; 4,4'-diphenylmethane diisocyanate content, 30%; the masterbatch base resin was a polyester elastomer).

Polyisocyanate Compound
4,4'-Diphenylmethane diisocyanate

Polyethylene Wax
Sanwax 161P, produced by Sanyo Chemical Industries, Ltd.

Montan Wax
Licowax E, produced by (Clariant Japan) K.K.

Thermoplastic Elastomer
A thermoplastic polyetherester elastomer (Hytrel 4001, produced by DuPont-Toray Co., Ltd.) was used.

Melt Mass Flow Rate (MFR)
The melt flow rate (or melt index) of the material was measured in accordance with JIS-K7210 (test temperature, 210° C.; test load, 21 N (2.16 kgf)).

Surface Hardness of Cover Layer
The Durometer D hardness was measured in accordance with JIS-K7215.

Rebound Resilience of Cover Material
The rebound resilience was measured in accordance with JIS-K7311.

Ball Hardness (mm)
The deformation when compressed under a load of 980 N (100 kg) was measured.

Ball Initial Velocity (m/s)
Measured in accordance with the measurement method of the USGA (R&A).

Scuff Resistance of Ball
The ball was held at respective temperatures of 23° C., 13° C. and 0° C. Using a swing robot machine, each ball was hit, using a pitching wedge as the club, at a head speed of 33 m/s, after which damage from the impact was visually rated according to the following criteria.
5: No damage whatsoever or substantially free of apparent damage.
4: Slight damage is apparent, but of minimal concern.
3: Surface is somewhat frayed.
2: Surface is frayed and damaged dimples are apparent.
1: Some dimples are completely obliterated.

Ball Manufacturability
Good: Molding conditions during mass production were stable; problems such as scorching of resin were infrequent.
NG: Molding conditions during mass production were unstable; high frequency of problems such as resin scorching.

The invention claimed is:

1. A golf ball comprising a core and one or more cover layers encasing the core, wherein at least one cover layer is formed by injection-molding a resin composition consisting essentially of (A) a thermoplastic polyurethane, (B) a polyisocyanate compound, and (C) a thermoplastic elastomer other than thermoplastic polyurethane, and at least some polyisocyanate compound in which all the isocyanate groups on the molecule remain in an unreacted state is present in the resin composition, wherein the resin composition consists of a plurality of the same kind of pellets, wherein the pellets are formed from a mixture of components (A), (B) and (C) as individual components, and wherein the at least one cover layer has a rebound resilience of at least 52%;
wherein the weight ratio (A):(B):(C) of the respective components is 100:{2-30}:{8-50}.

2. The golf ball of claim 1, wherein some of the isocyanate groups in component B form bonds with active hydrogens in component A and/or component C, and the other isocyanate groups remain in an unreacted state within the resin composition.

3. The golf ball of claim 1, wherein the total weight of components A and B combined is at most 90 wt % of the overall weight of the cover layer.

4. The golf ball of claim 1, wherein the resin composition has a melt mass flow rate (MFR) at 210° C. of at least 5 g/10 min.

5. The golf ball of claim 1, wherein component B is one or more polyisocyanate compound selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate.

6. The golf ball of claim 1, wherein component B is one or more polyisocyanate compound selected from the group consisting of 4,4'-diphenylmethane diisocyanate, dicyclohexylmethane diisocyanate and isophorone diisocyanate.

7. The golf ball of claim 1, wherein component C is one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene ethylene/butylene-ethylene block copolymers and modified forms thereof, styrene-ethylene/butylene-styrene block copolymers and modified forms thereof, ABS resins, polyacetals, polyethylenes and nylon resins.

8. The golf ball of claim 1, wherein component C is one or more selected from the group consisting of polyester elastomers, polyamide elastomers and polyacetals.

9. The golf ball of claim 1, wherein some of the isocyanate groups in component B form bonds with active hydrogens in component A, and the other isocyanate groups remain in an unreacted state within the resin composition.

10. The golf ball of claim 1, wherein each of the pellets of the resin composition has a length of 1 to 10 mm and a diameter of 0.5 to 5 mm.

11. The golf ball of claim 1, wherein the resin composition is worked in an extruder and then is injection-molded, and
wherein the unreacted isocyanate groups react with component A or component C to form a crosslinked material while the resin composition is being injection-molded.

12. The golf ball of claim 1, wherein component B is isophorone diisocyanate.

* * * * *